United States Patent [19]

Mori et al.

[11] Patent Number: 5,696,322
[45] Date of Patent: Dec. 9, 1997

[54] VIBRATING GYROSCOPE

[75] Inventors: Akira Mori; Takeshi Nakamura, both of Nagaokakyo, Japan

[73] Assignee: Murata Manufacturing Co., Ltd., Kyoto-Fu, Japan

[21] Appl. No.: 352,345

[22] Filed: Dec. 8, 1994

[30] Foreign Application Priority Data

Dec. 14, 1993 [JP] Japan .................. 4-343128

[51] Int. Cl.$^6$ ..................................... G01P 9/04
[52] U.S. Cl. ..................................... 73/504.12
[58] Field of Search ............... 73/504.12, 504.14, 73/504.13, 504.15; 310/316

[56] References Cited

U.S. PATENT DOCUMENTS

| 5,349,857 | 9/1994 | Kasanami et al. | 73/504.14 |
| 5,434,467 | 7/1995 | Abe et al. | 310/316 |

*Primary Examiner*—John E. Chapman
*Attorney, Agent, or Firm*—Nikaido Marmelstein Murray & Oram LLP

[57] ABSTRACT

A vibrating gyroscope 10 includes a vibrator 12 which has a vibrating body 14, and detecting devices 16a, 16b and a driving device 16c formed on side faces of the vibrating body 14. Output currents of the detecting devices 16a, 16b are converted to voltages by current-voltage converting circuits 24 and 26. Output voltages of the current-voltage converting circuits 24, 26 are fed back to an oscillation circuit 40 which has a phase correction circuit 42 and an amplifying circuit 44. A driving signal having a constant voltage is supplied to the driving device 16c from the amplifying circuit 44. The output signals of the current-voltage converting circuits 24, 26 are supplied to a detecting circuit 52 which has a differential circuit 54 and a synchronous detecting circuit 56.

14 Claims, 5 Drawing Sheets

VIBRATING GYROSCOPE

BACKGROUND OF THE INVENTION

1. Field of the Invention

The present invention relates to a vibrating gyroscope, and particularly to a vibrating gyroscope for detecting a rotational angular velocity by utilizing a bending vibration of a prism-shaped vibrating body.

2. Description of the Prior Art

FIG. 4 is an illustrative view showing an example of a conventional vibrating gyroscope. A vibrating gyroscope 1 includes a vibrator 2. The vibrator 2 includes a vibrating body 3 having, for example, a regular triangular prism shape. Piezoelectric elements 4a, 4b and 4c are formed respectively on side faces of the vibrating body 3. An oscillation circuit 5 is connected between the piezoelectric elements 4a, 4b and the piezoelectric element 4c. The piezoelectric elements 4a and 4b are used for driving the vibrating gyroscope to generate a bending vibration in the vibrating body 3, and for detecting vibration generated to obtain a signal corresponding to a rotational angular velocity. The piezoelectric element 4c is used for feedback of a signal to the oscillation circuit 5, when the vibrating body 3 is driven. The piezoelectric elements 4a and 4b are connected to a detecting circuit 6. The detecting circuit 6 includes a differential circuit 7 and a synchronous detecting circuit 8. An output signal of the differential circuit 7 is detected synchronously by the synchronous detecting circuit 8.

In the vibrating gyroscope 1, the vibrating body 3 bends and vibrates in a direction perpendicular to the face of the piezoelectric element 4c by a signal from the oscillation circuit 5. At this time, input signals to the differential circuit 7 are the same signal, and an output signal is not obtained from the differential circuit 7. When the vibrating body 3 rotates on its axis, a vibrating direction of the vibrating body 3 changes by a Coriolis force. Thus, a difference is produced between the output signals of the piezoelectric elements 4a and 4b, and the difference of the signals is obtained from the differential circuit 7. An output signal of the differential circuit 7 is detected by the synchronous detecting circuit 8. Since an output signal of the synchronous detecting circuit 8 corresponds to a rotational angular velocity, a rotational angular velocity supplied to the vibrating gyroscope 1 can be detected by measuring the output signal of the synchronous detecting circuit 8.

However, in the conventional vibrating gyroscope, a load impedance of the piezoelectric element is large. When frequency characteristics or capacitances of the piezoelectric elements change due to a variation of circumferential temperature or the like, it is possible that the voltage of the driving signal and the voltage of the signal corresponding to a rotational angular velocity change. When the driving signal changes, a vibration of the vibrating body becomes unstable, and results in a drift signal. When the signal corresponding to the rotational angular velocity changes, the rotational angular velocity can not be detected accurately.

SUMMARY OF THE INVENTION

It is, therefore, the primary object of the present invention to provide a vibrating gyroscope which can reduce a drift signal due to a temperature drift or a characteristic variation of the vibrator, and can detect the rotational angular velocity accurately.

The present invention is directed to a vibrating gyroscope comprising a prism-shaped vibrating body, plural detecting means formed on side faces of the vibrating body for obtaining output currents, a driving means formed on a side face of the vibrating body for generating a vibration to the vibrating body, current-voltage converting circuits for converting the output currents of the detecting means to voltages, an oscillation circuit for receiving output signals of the current-voltage converting circuits as a feedback signal and for supplying a driving signal having a constant voltage to the driving means, and a detecting circuit for detecting output signals of the current-voltage converting circuit.

Since the driving signal, having a constant voltage, is supplied to the driving means, the vibrating body can be driven stably without regard to the impedance variation of the vibrator. The output signals of the detecting means are used for obtaining a signal corresponding to a rotational angular velocity. At this time, output currents of the detecting means are converted to voltages by the current-voltage converting circuit. By detecting the output currents of the detecting means, load impedances of the detecting means become approximately zero, and the influence of impedance variation of the vibrator is reduced.

According to the present invention, since the vibrating body bends and vibrates by the driving signal having a constant voltage, a stable bending vibration can be obtained without regard to the impedance variation of the vibrator. Thus, a drift signal due to a variation of bending vibration can be prevented. By detecting the output currents of the detecting means in order to obtaining the signal corresponding to the rotational angular velocity, the influence of impedance variation of the vibrator can be reduced. Thus, the influence of variation of the signal corresponding to the rotational angular velocity due to the impedance variation of the vibrator can be reduced. Therefore, the drift signal due to temperature drift or characteristic variation of the vibrator can be prevented.

The above and further objects, features, aspects and advantages of the present invention will be more fully apparent from the following detailed description with the accompanying drawings.

DESCRIPTION OF THE PREFERRED EMBODIMENTS

Figure 1:
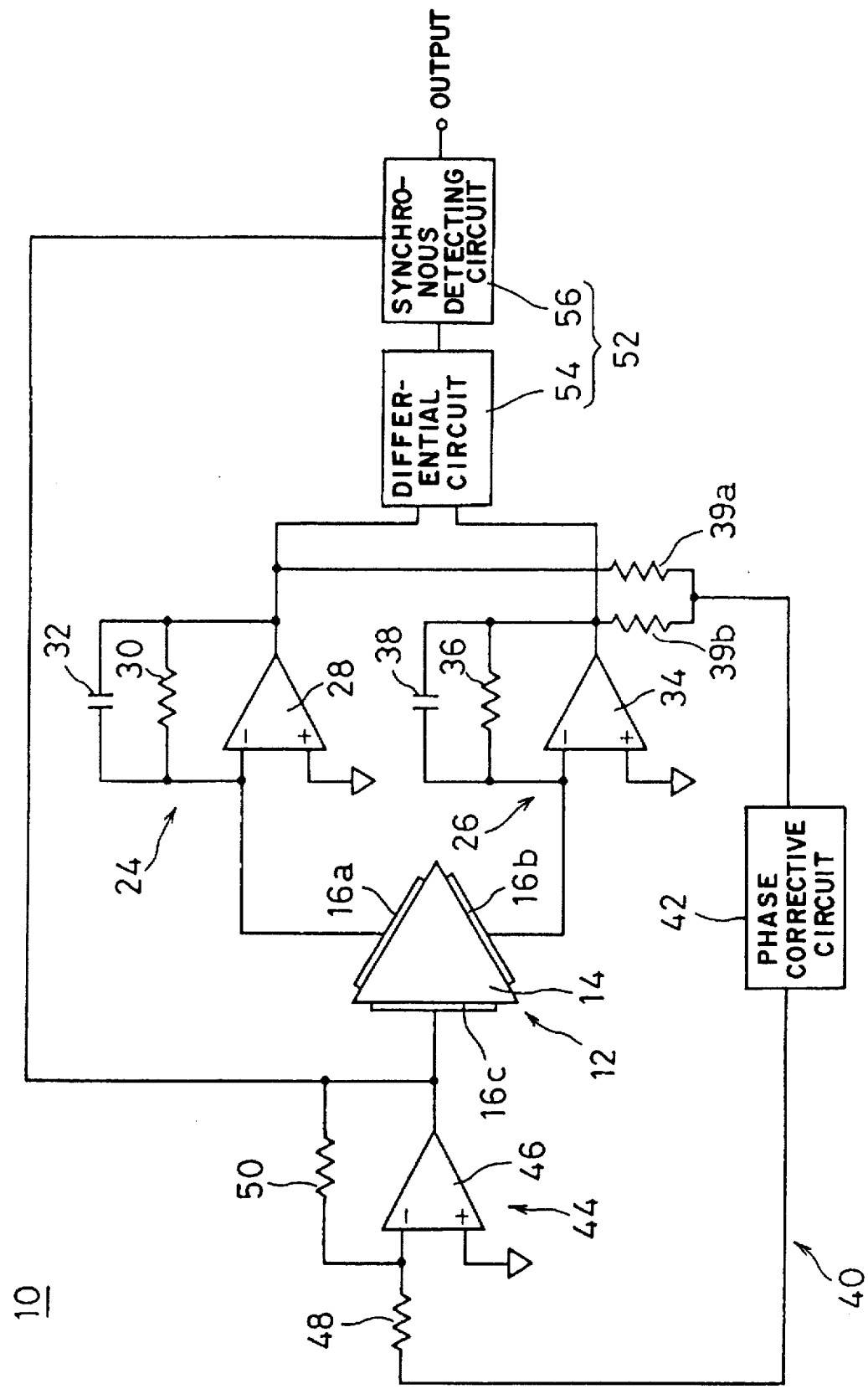
FIG. 1 is an illustrative view showing an embodiment of the present invention.
Figure 2:
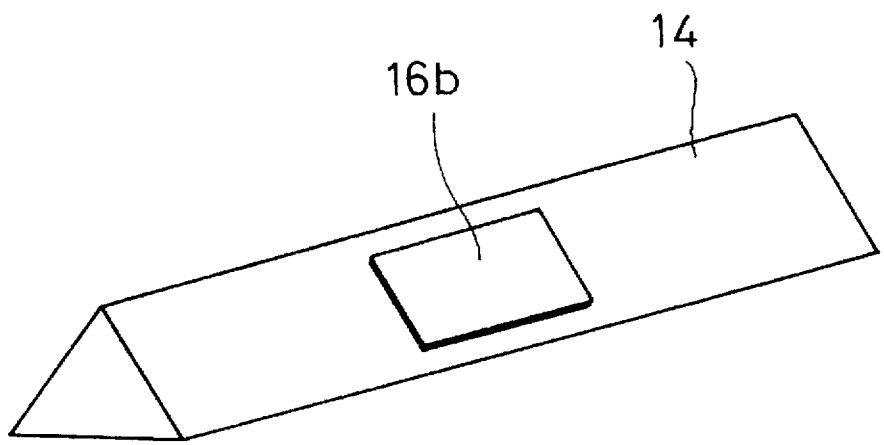
FIG. 2 is a perspective view showing a vibrator of the vibrating gyroscope of FIG. 1.

FIG. 1 is an illustrative view showing an embodiment of the present invention. A vibrating gyroscope 10 includes a vibrator 12. As shown in FIG. 2, the vibrator 12 includes a vibrating body 14 having, for example, a regular triangular prism shape. The vibrating body 14 is formed with materials that generates a mechanical vibration such as elinver, iron-nickel alloy, quartz, glass, crystal, ceramics or the like.

Figure 3:
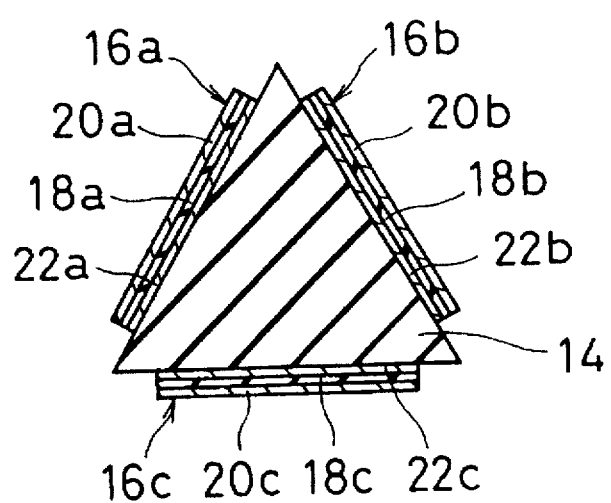
FIG. 3 is a sectional view showing the vibrator of FIG. 2.
Figure 4:
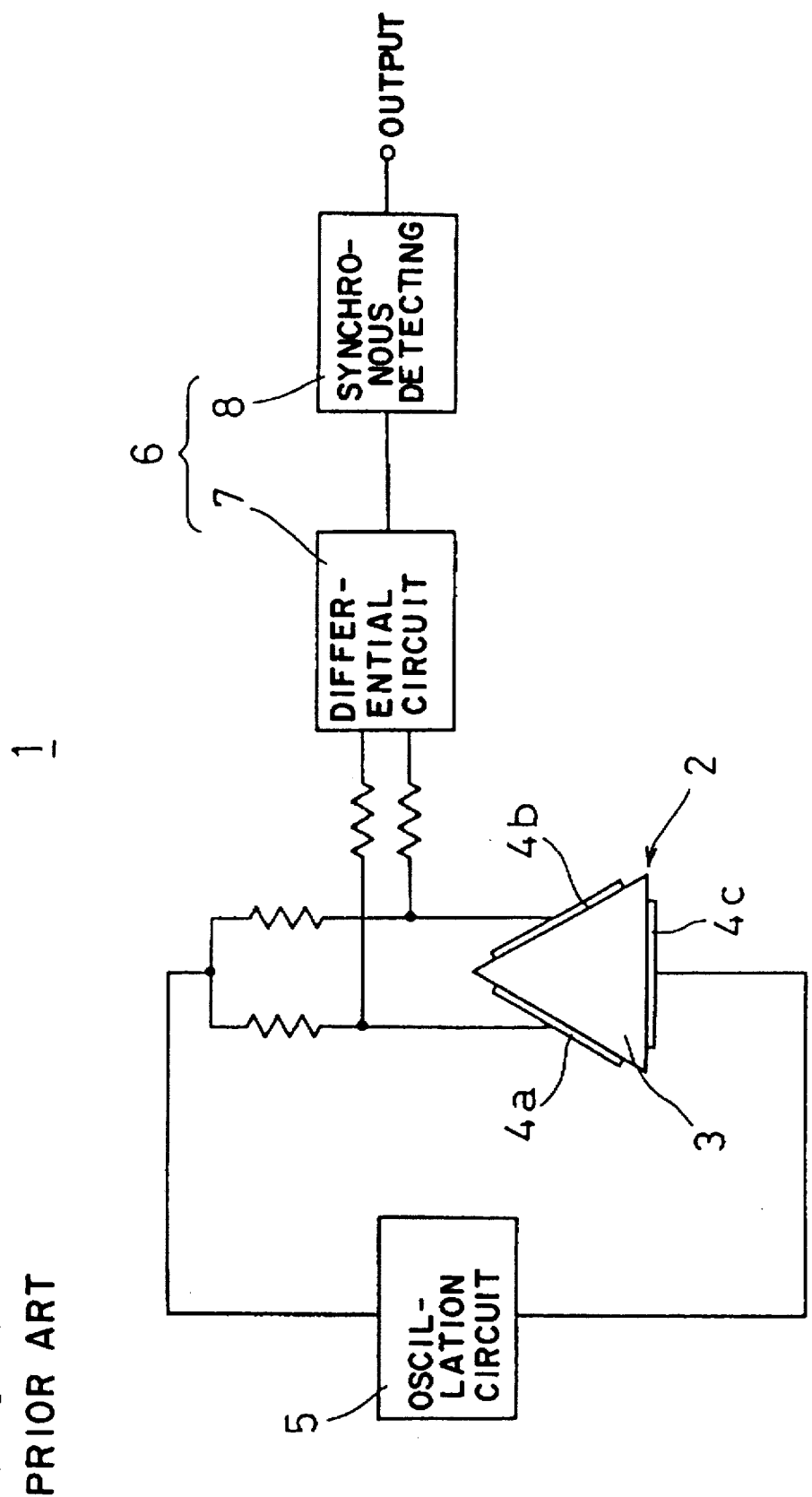
FIG. 4 is an illustrative view showing a conventional vibrating gyroscope.

Detecting means 16a, 16b and a driving means 16c are formed on side faces of the vibrating body 14 as shown in FIG. 3. In this embodiment, the piezoelectric elements are used as the detecting means 16a, 16b and the driving means 16c. The piezoelectric element 16a includes a piezoelectric plate 18a made of, for example, piezoelectric ceramics. Electrodes 20a and 22a are formed on both faces of the piezoelectric plate 18a. One electrode 22a is bonded to the vibrating body 14. Similarly, the piezoelectric elements 16b and 16c include piezoelectric plates 18b and 18c, and electrodes 20b, 22b and electrodes 20c, 22c are formed on both faces of respective piezoelectric plates 18b, 18c. Electrodes 22b and 22c of the piezoelectric elements 16b and 16c are bonded to the vibrating body 14. The piezoelectric elements 16a and 16b are used for feedback when a bending vibration is generated to the vibrating body 14, and for detecting to obtain a signal corresponding to a rotational angular velocity. The piezoelectric element 16c is used for driving to generate a bending vibration to the vibrating body 14, and a driving signal is supplied to the piezoelectric element 16c.

The piezoelectric elements 16a and 16b are connected to current-voltage converting circuits 24 and 26 for converting output currents of the piezoelectric elements 16a, 16b to voltages. The current-voltage converting circuit 24 includes an operational amplifier 28, and a noninverting terminal of the operational amplifier 28 is connected to an intermediate point of a source voltage. A parallel circuit, of a resistor 30 and a capacitor 32, is connected between an inverting terminal of the operational amplifier 28 and its output terminal. Similarly, the current-voltage converting circuit 26 includes an operational amplifier 34, and a noninverting terminal of the operational amplifier 34 is connected to an intermediate point of a source voltage. A parallel circuit, of a resistor 36 and a capacitor 38, is connected between an inverting terminal of the operational amplifier 34 and its output terminal.

The output terminals of the current-voltage converting circuits 24 and 26 are connected to an oscillation circuit 40 via resistors 39a and 39b. The oscillation circuit 40 includes a phase correction circuit 42 and an amplifying circuit 44. A phase of the output signals of the current-voltage converting circuits 24, 26 is corrected by the phase correction circuit 42. An output signal of the phase correction circuit 42 is amplified by the amplifying circuit 44, and an output signal of the amplifying circuit 44 is supplied to the piezoelectric element 16c. The amplifying circuit 44 includes an operational amplifier 46, and a noninverting terminal of the operational amplifier 46 is connected to an intermediate point of source voltage. The phase correction circuit 42 is connected to an inverting terminal of the operational amplifier 46 via a resistor 48. A resistor 50 is connected between the inverting terminal and the output terminal of the operational amplifier 46. A driving signal having a constant voltage is supplied to the piezoelectric element 16c by the amplifying circuit 44.

The output signals of the current-voltage converting circuits 24 and 26 are supplied to a detecting circuit 52. The detecting circuit 52 includes a differential circuit 54 and a synchronous detecting circuit 56. The output signals of the current-voltage converting circuits 24 and 26 are supplied to the differential circuit 54, and an output signal of the differential circuit 54 is detected by the synchronous detecting circuit 56. The output signal of the differential circuit 54 is detected in synchronous with the output signal of the amplifying circuit 44 by the synchronous detecting circuit 56.

When the vibrating gyroscope 10 is used, the signal of the oscillation circuit 40 is supplied to the piezoelectric element 16c, and output currents of the piezoelectric elements 16a and 16b are converted to the voltage signals which are fed back to the oscillation circuit 40. By the driving signal, the vibrating body 14 bends and vibrates in a direction perpendicular to the face of the piezoelectric element 16c. When the vibrating body 14 does not rotate, the output currents of the piezoelectric elements 16a and 16b are the same current, and an output signal is not obtained from the differential circuit 54. In this situation, when the vibrating body 14 rotates on its axis, a vibrating direction of the vibrating body 14 changes due to a Coriolis force. A difference is produced between output currents of the piezoelectric elements 16a and 16b, and a difference is produced between the output voltages of the current-voltage converting circuits 24 and 26. The difference of the output voltages between the current-voltage converting circuits 24 and 26 is obtained from the differential circuit 54. The output signal obtained from the differential circuit 54 is detected synchronously by the synchronous detecting circuit 56. Since the output signal of the synchronous detecting circuit 56 corresponds to a rotational angular velocity, the rotational angular velocity supplied to the vibrating gyroscope 10 can be detected by measuring the output signal of the synchronous detecting circuit 56.

In the vibrating gyroscope 10, since the vibrating body 14 bends and vibrates by supplying the driving signal having a constant voltage to the piezoelectric element 16c, a stable bending vibration can be obtained even when a frequency characteristic or a capacitance of the vibrator 12 changes due to a variation of circumferential temperature or the like. Thus, a variation of the output signals of the piezoelectric elements 16a, 16b due to a variation of the vibration of the vibrating body 14 can be reduced. By measuring the output currents of the piezoelectric elements 16a, 16b in order to detect the rotational angular velocity, load impedances of the piezoelectric elements become approximately zero, and an influence of the impedance variation of the vibrator 12 due to a variation of circumferential temperature can be reduced. Therefore, the variation of the output signal due to the impedance variation of the vibrator 12 can be prevented, and a drift signal can be reduced. As such, even when the vibration characteristics of the vibrator 12 changes, the influence to the signal corresponding to a rotational angular velocity is small, and the drift signal can be prevented. Thus, the rotational angular velocity can be detected with a high sensitivity.

Figure 5:
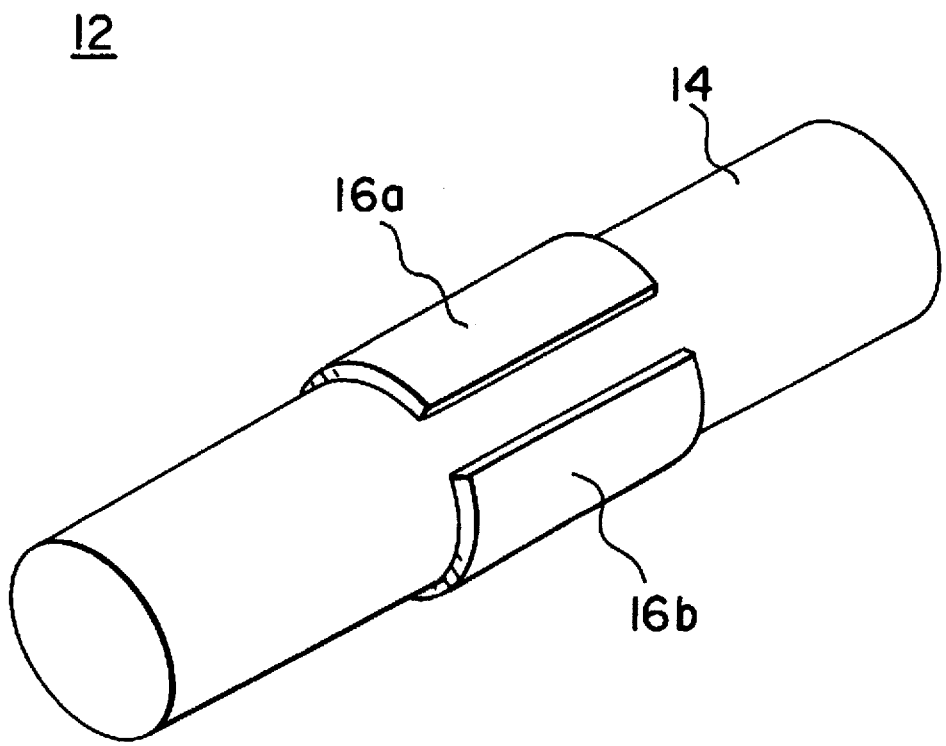
FIG. 5 is a perspective view showing a circular vibrator.
Figure 6:
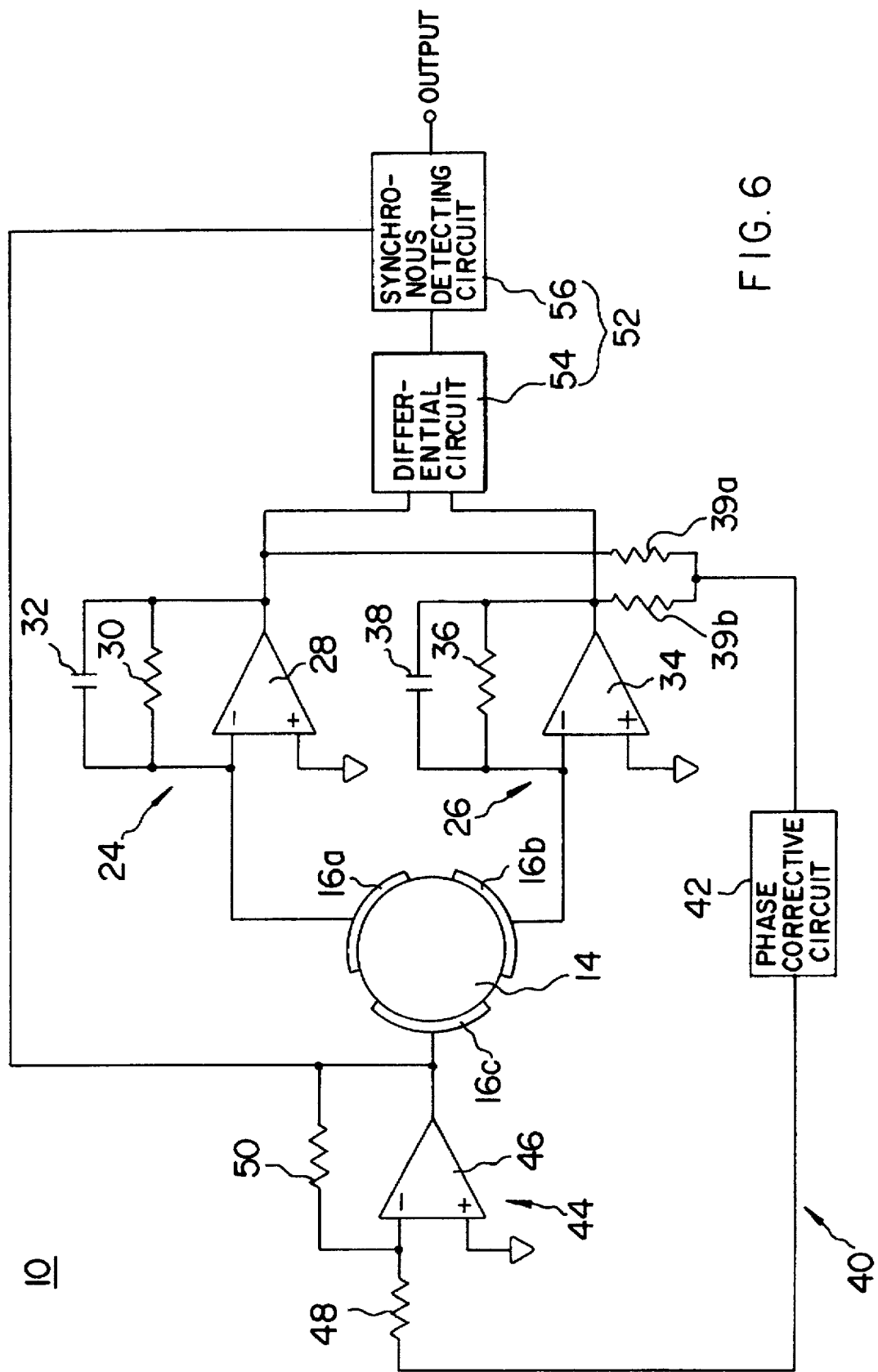
FIG. 6 is an illustrative view showing the present invention with the circular vibrator of FIG. 5.

In the above embodiment, though the piezoelectric elements are used as the driving means and the detecting means, when the vibrating body is made with a piezoelectric material, electrodes are used as the driving means and the detecting means. In this case, electrodes 16a, 16b as the detecting means and a electrode 16c as the driving means are formed on side faces of the vibrating body 14. By polarizing the vibrating body 14 in a direction perpendicular to the face of the electrode 16c, the rotational angular velocity can be detected similarly to the above embodiment. In the case of using such vibrator, the vibrating gyroscope whose drift signal is small can be obtained by driving the vibrating body 14 with the driving signal having a constant voltage, and by detecting the output currents of the electrodes 16a, 16b. Though the vibrating body having a regular triangular prism shape is used, the vibrating body having other prism shapes such as a rectangular prism shape or a cylindrical shape may be used such as shown in FIG. 5 and 6.

While the present invention has been particularly described and shown, it is to be understood that such description is used merely as an illustration and example rather than limitation, and the spirit and scope of the present invention is determined solely by the terms of the appended claims.

What is claimed is:

1. A vibrating gyroscope comprising:

a vibrating body;

plural detecting means formed on said vibrating body for obtaining output currents;

a driving means formed on said vibrating body for generating a vibration to said vibrating body;

current-voltage converting circuits for converting the output currents of said detecting means to voltages, each of said current-voltage converting circuits including an operational amplifier for keeping load impedances of said detecting means substantially at zero;

an oscillation circuit for receiving output signals of said current-voltage converting circuits as a feedback signal and for supplying a driving signal having a constant voltage to said driving means; and a detecting circuit for detecting output signals of said current-voltage converting circuits.

2. A vibrating gyroscope in accordance with claim 1, wherein said oscillation circuit includes a phase correction circuit for correcting a phase of said feedback signal, and an amplifying circuit for amplifying an output signal of said phase correction circuit.

3. A vibrating gyroscope in accordance with claim 1, wherein said detecting circuit includes a differential circuit for obtaining a difference of output signals between said current-voltage converting circuits, and a synchronous detecting circuit for detecting an output signal of said differential circuit in synchronous with an output signal of said oscillation circuit.

4. A vibrating gyroscope in accordance with claim 2, wherein said detecting circuit includes a differential circuit for obtaining a difference of output signals between said current-voltage converting circuits, and a synchronous detecting circuit for detecting an output signal of said differential circuit in synchronous with an output signal of said amplifying circuit.

5. A vibrating gyroscope in accordance with claim 1, wherein said vibrating body is formed in a regular triangular prism shape, and piezoelectric elements are used as said detecting means and said driving means.

6. A vibrating gyroscope in accordance with claim 2, wherein said vibrating body is formed in a regular triangular prism shape, and piezoelectric elements are used as said detecting means and said driving means.

7. A vibrating gyroscope in accordance with claim 3, wherein said vibrating body is formed in a regular triangular prism shape, and piezoelectric elements are used as said detecting means and said driving means.

8. A vibrating gyroscope in accordance with claim 4, wherein said vibrating body is formed in a regular triangular prism shape, and piezoelectric elements are used as said detecting means and said driving means.

9. A vibrating gyroscope according to claim 1, wherein said plural detecting means are positioned on said vibrating body to have equivalent levels of output currents at non-rotation and to have different levels of output currents at rotation.

10. A vibrating gyroscope according to claim 1, wherein said vibrating body is formed in a cylindrical shape.

11. A vibrating gyroscope according to claim 2, wherein said vibrating body is formed in a cylindrical shape.

12. A vibrating gyroscope according to claim 3, wherein said vibrating body is formed in a cylindrical shape.

13. A vibrating gyroscope according to claim 4, wherein said vibrating body is formed in a cylindrical shape.

14. A vibrating gyroscope according to claim 1, wherein each said current-voltage converting circuit further includes a resistor and a capacitor connected in parallel.

* * * * *